(12) United States Patent
Brain

(10) Patent No.: US 10,018,077 B2
(45) Date of Patent: Jul. 10, 2018

(54) GAS TURBINE ENGINE MOUNTING ARRANGEMENT

(71) Applicant: ROLLS-ROYCE PLC, London (GB)

(72) Inventor: Glyn D Brain, Derby (GB)

(73) Assignee: ROLLS-ROYCE plc, London (GB)

( * ) Notice: Subject to any disclaimer, the term of this patent is extended or adjusted under 35 U.S.C. 154(b) by 369 days.

(21) Appl. No.: 14/858,510

(22) Filed: Sep. 18, 2015

(65) Prior Publication Data

US 2016/0090868 A1 Mar. 31, 2016

(30) Foreign Application Priority Data

Sep. 30, 2014 (GB) .................................. 1417202.7

(51) Int. Cl.
| | | |
|---|---|---|
| F16D 1/00 | (2006.01) |
| F01D 25/28 | (2006.01) |
| B64D 27/26 | (2006.01) |
| F16B 19/02 | (2006.01) |
| F16B 39/10 | (2006.01) |
| F16B 41/00 | (2006.01) |

(Continued)

(52) U.S. Cl.
CPC .............. *F01D 25/28* (2013.01); *B64D 27/26* (2013.01); *F16B 19/02* (2013.01); *F16B 39/10* (2013.01); *F16B 41/005* (2013.01); *F16B 43/00* (2013.01); *F16C 11/045* (2013.01); *G01M 17/00* (2013.01); *B64D 2027/266* (2013.01); *B64D 2027/268* (2013.01); *F05D 2220/323* (2013.01); *F05D 2230/60* (2013.01); *F05D 2240/90* (2013.01); *F05D 2260/31* (2013.01)

(58) Field of Classification Search
CPC .............. B64D 27/26; B64D 2027/266; B64D 2027/268; F01D 25/28; F16B 9/02; F16B 39/10; F16B 41/005; F16B 43/00; F16C 11/045; G01M 17/00; F05D 2220/323; F05D 2230/60; F05D 2240/90; F05D 2260/31; Y10T 403/32909; Y10T 403/75
USPC .............. 403/156, 408.1; 411/910, 119–120; 470/2, 3; 60/796, 797; 415/213.1
See application file for complete search history.

(56) References Cited

U.S. PATENT DOCUMENTS

| | | | | |
|---|---|---|---|---|
| 1,731,337 A | * | 10/1929 | Giovannini | ............. F16B 39/24 411/120 |
| 3,501,790 A | * | 3/1970 | Wickers | ................ B21C 23/183 29/432 |

(Continued)

FOREIGN PATENT DOCUMENTS

EP 0997653 A2 5/2000

OTHER PUBLICATIONS

Mar. 26, 2015 Search Report issued in British Patent Application No. GB1417202.7.

(Continued)

*Primary Examiner* — Amber Anderson
*Assistant Examiner* — Nahid Amiri
(74) *Attorney, Agent, or Firm* — Oliff PLC

(57) ABSTRACT

A failsafe pin for providing a backup load path for attaching a gas turbine engine to an aircraft structure is provided with a driving element that allows a torque to be provided to the pin in order to check whether the pin has been engaged, and thus whether a primary load path has failed. The pin is provided with anti-tamper arrangements in order to ensure that the pin itself is not compromised when being tested for engagement.

12 Claims, 6 Drawing Sheets

(51) Int. Cl.
*F16B 43/00* (2006.01)
*F16C 11/04* (2006.01)
*G01M 17/00* (2006.01)

(56) References Cited

U.S. PATENT DOCUMENTS

| | | | | |
|---|---|---|---|---|
| 4,065,077 | A * | 12/1977 | Brooks | B64D 27/26 244/54 |
| 4,253,509 | A * | 3/1981 | Collet | F16B 41/005 285/80 |
| 4,889,458 | A * | 12/1989 | Taylor | F16B 21/10 403/156 |
| 4,943,013 | A | 7/1990 | Kapala et al. | |
| 5,228,250 | A * | 7/1993 | Kesselman | F16B 31/021 411/373 |
| 6,357,220 | B1 * | 3/2002 | Snyder | F02C 7/32 60/223 |
| 6,772,877 | B1 * | 8/2004 | Lam | F42B 39/00 206/3 |
| 8,042,764 | B2 * | 10/2011 | Levert | B64D 27/26 244/54 |
| 8,858,171 | B2 * | 10/2014 | Parker | B64C 13/42 244/99.5 |
| 9,227,722 | B2 * | 1/2016 | Soenarjo | B64C 9/16 |
| 2003/0019259 | A1 * | 1/2003 | Nicodemus | B25B 13/485 70/233 |
| 2005/0067528 | A1 * | 3/2005 | Loewenstein | B64D 27/26 244/54 |
| 2008/0042007 | A1 * | 2/2008 | Machado | B64D 27/26 244/54 |
| 2008/0232924 | A1 | 9/2008 | Levert | |
| 2010/0032520 | A1 * | 2/2010 | Mauran | B64C 9/02 244/99.4 |
| 2012/0006939 | A1 * | 1/2012 | Parker | B64C 13/42 244/99.5 |
| 2012/0012732 | A1 * | 1/2012 | Zameroski | B64D 27/26 248/638 |
| 2013/0202450 | A1 | 8/2013 | Ivakitch et al. | |
| 2015/0166190 | A1 * | 6/2015 | Cassagne | B64D 27/26 403/57 |
| 2015/0285091 | A1 * | 10/2015 | Bulgrin | F01D 9/02 415/208.1 |
| 2015/0377270 | A1 * | 12/2015 | Foster | B64D 27/26 411/340 |

OTHER PUBLICATIONS

Jan. 29, 2016 Search Report issued in European Patent Application No. 15185914.7.

* cited by examiner

GAS TURBINE ENGINE MOUNTING ARRANGEMENT

CROSS-REFERENCE TO RELATED APPLICATIONS

This application is based upon and claims the benefit of priority from British Patent Application Number 1417202.7 filed 30 Sep. 2014, the entire contents of which are incorporated by reference.

BACKGROUND

1. Field of the Disclosure

All modern aircraft are provided with power systems that need to be connected to an airframe. The connection between the power system and the airframe needs to be such that the power system can be carried by the airframe, and the thrust generated by the power system can be transferred to the airframe.

2. Description of the Related Art

The thrust generated by modern gas turbine engines, such as turbofan engines, can be extremely high, for example up to and even in excess of 100,000 lbs. Accordingly, the mounting arrangements that are required to attach the gas turbine engines to the airframes are necessarily strong enough to transfer such high loads, meaning that they contribute significantly to the weight of the gas turbine engine installation, and thus to the overall weight of the aircraft.

Furthermore, it is essential that the mounting arrangements operate reliably, and that they are provided with so called failsafe systems that ensure continued safe operation in the event that a part of the mounting arrangement fails or breaks. One such failsafe arrangement is a failsafe pin that only engages in the event of a failure of a primary fixing mechanism in the mounting arrangement.

It is necessary to be able to test whether or not the failsafe pin has been engaged so as to be able to determine whether there has been a failure of part of the primary fixing mechanism. Such a failure of part of a primary fixing mechanism may not be detected through visual inspection alone.

There is a danger that in the process of performing the necessary engagement test on the failsafe pin, the pin itself may be compromised, for example through unintentional partial disassembly or loosening of its components.

OBJECTS AND SUMMARY

It is desirable to be able to safely and reliably test the integrity of the primary fixing mechanism, without the possibility of compromising the failsafe system. The ability to safely and reliably test the integrity of a primary fixing mechanism, without the possibility of compromising a failsafe system, is desirable in any arrangement having a primary fixing mechanism and a failsafe (or backup) system.

According to an aspect there is provided a pin for extending through a first hole of a first body and second hole of a second body. The pin may prevent separation of the first body from the second body. The pin comprises a cylindrical body having a through-hole passing from a first end face (for example an opening therein) to a second end face (for example an opening therein) of the cylindrical body. The pin comprises a driving washer provided on the first end face. The pin comprises an anti-tamper washer provided on the second end face. The pin comprises a bolt passing through the driving washer, through the through-hole in the cylindrical body, and through the anti-tamper washer to engage a nut, so as to clamp the cylindrical body, driving washer and anti-tamper washer together.

The driving washer comprises a driving portion through which a torque may be provided to the pin. The driving washer comprises a retaining feature (or retainer) against which either a bolt head of the bolt or a nut head of the nut is located so as to prevent full access to the respective bolt head or nut head when the pin is in an assembled state The anti-tamper washer is provided with an anti-tamper element that prevents full access to the other of the nut head or the bolt head when the pin is in an assembled state.

Purely by way of example, the bolt head of the bolt may be retained by the retaining feature of the driving washer. Purely by way of example, the anti-tamper element may prevent full access to the nut head.

The driving portion may be any desired configuration, for example a shape that can be engaged by a generic or bespoke tool. Purely by way of example, the perimeter of the driving portion may be a hexagonal shape, which may be engaged by a socket in order to apply a torque.

The nut and/or bolt heads may, for example, by standard shapes that may be engaged by standard tools. Purely by way of example, the perimeter of the nut and/or bolt heads may be hexagonally shaped, and may be engaged by a socket.

The driving portion may be said to be integral to the driving washer. The driving portion may be larger (for example in plan view) than the bolt head. A tool required to apply torque to the driving portion may have a larger engaging portion than a tool required to apply torque to the bolt head.

By preventing full access to the bolt head, the retaining feature may prevent the bolt from being rotated, for example by preventing the bolt head from being accessed by a tool. By preventing full access to the nut head, the retaining feature may prevent the nut from being rotated, for example by preventing the nut head from being accessed by a tool.

The driving washer and/or the anti-tamper washer may be said to have through holes formed therein in order to allow the bolt to pass through. When assembled, through holes of the driving washer, the anti-tamper washer and the cylindrical body may all be aligned with the longitudinal (or rotational) axis of the bolt.

According to an aspect, there is provided a method of assembling an anti-tamper securing pin for securing a first body to a second body. The method comprises passing a bolt through, in turn: a driving washer; a through-hole in a cylindrical body; and an anti-tamper washer. The method comprises tightening the bolt onto a nut so as to clamp the cylindrical body, driving washer and anti-tamper washer together. The anti-tamper washer is provided with an anti-tamper element that prevents full access to a nut head of the nut or a bolt head of the bolt when the pin is in an assembled state. The driving washer comprises a retaining feature against which the other of the nut head and the bolt head is retained when the nut and bolt are tightened, so as to prevent full access to the retained nut head or bolt head when the pin is in an assembled state.

The methods and apparatuses described and/or claimed herein may allow the pin to be rotated without the possibility of partial disassembly of the pin. This may allow the engagement of a pin (for example with first and second bodies) to be reliably and safely tested without the possibility of compromising the operation of the pin. For example, in the assembled state, it may not be possible to rotate either the nut or the bolt without disassembly of another part of the pin.

The retaining feature may take any suitable form, for example comprising one or more surfaces against which a surface of the nut or bolt head is adjacent when the pin is assembled. The retaining feature may, for example, be a part of the driving portion. For example, the retaining feature may be a recess formed in the driving portion. The nut or bolt head may be drawn into the recess when the nut and bolt are tightened during assembly of the pin.

The anti-tamper element may also take any suitable form. For example, at least a part of the anti-tamper element may be integrally formed with the anti-tamper washer, and/or or a part of the anti-tamper element may be formed as a separate part before being connected to the rest of the anti-tamper washer.

The anti-tamper element may comprise a shield that at least partially surrounds the nut or bolt head. The anti-tamper element may comprise a recess that at least partially covers the nut or bolt head. The anti-tamper element may comprise a though-hole that (at least partially) surrounds the perimeter of the nut or bolt head. For example, the anti-tamper element may comprise a plate having such a through-hole formed therein.

The anti-tamper element may comprise a fixing hole through which a fixing element passes in order to connect the anti-tamper element to the anti-tamper washer. The anti-tamper washer may be provided with a receiving feature into which the fixing element is received. Such a fixing element (and optionally receiving feature) may be offset from the centreline of the cylindrical body (and thus from the centreline of the nut and bolt).

The driving washer and the first end face of the cylindrical body may be provided with corresponding engagement elements to allow torque provided to the driving washer via the driving portion to be transmitted to the cylindrical body. For example one of the driving washer and the first end face of the cylindrical body may be provided with a dowel that engages (or fits into) a recess in the other of the driving washer and the first end face of the cylindrical body. Such a dowel and recess may be offset from the centreline of the cylindrical body. More than one such dowel and recess may be provided.

The anti-tamper washer and the second end face of the cylindrical body may be provided with corresponding engagement elements to allow torque to be passed from the cylindrical body to the anti-tamper washer. For example one of the anti-tamper washer and the second end face of the cylindrical body may be provided with a dowel that engages (or fits into) a recess in the other of the anti-tamper washer and the second end face of the cylindrical body. Such a dowel and recess may be offset from the centreline of the cylindrical body. More than one such dowel and recess may be provided.

According to an aspect, there is provided a mounting arrangement for attaching a first body to a second body. The mounting arrangement comprises a pin as described and/or claimed herein. The pin passes through a first hole in the first body and a second hole in the second body. The pin may be constrained from movement in the direction of the longitudinal axis of the cylindrical body through engagement of the driving washer with the first or second body and engagement of the anti-tamper washer with the first or second body.

Such a mounting arrangement may comprise a further, primary, connection between the first body and the second body. The pin may be a failsafe pin that only engages upon failure of the primary connection.

Pins and mounting arrangements described and/or claimed herein may be applicable to various applications.

For example, the first body may be a mounting bracket for connecting an aircraft structure to a gas turbine engine via a link element, the second body being the link element. The mounting bracket may comprise two lugs each having a mounting hole. The link element may be positioned at least partially between the two lugs and may comprise one link element hole. The centrelines of the mounting holes of the lugs and the link element hole may be aligned. The cylindrical body may extend, in order, through a mounting hole in one lug of the mounting bracket, the link element hole, and the mounting hole of the other lug.

The driving washer of the pin may or may not engage with one lug and the anti-tamper washer of the pin may or may not engage with the other lug, for example when the mounting arrangement is assembled. The link element may, for example, not be in contact with the pin after assembly and/or during normal operation, although of course this need not be the case.

The term normal operation may mean a situation in which the failsafe pin is not engaged, for example because the primary load path is functioning as intended.

Upon assembly and in normal operation of such a mounting arrangement, substantially no load may be transferred between the mounting bracket and the link element via the pin, such that the cylindrical body is rotatable within the mounting holes of the mounting bracket and link element by applying a torque to the driving portion of the driving washer.

According to an aspect, there is provided a method of testing the integrity of an engine mount for mounting a gas turbine engine to an aircraft structure. The engine mount comprises a primary fixture for connecting the gas turbine engine to the aircraft structure. The engine mount comprises a failsafe fixture that only engages to connect the gas turbine engine to the aircraft structure in the event of failure of the primary fixture. The failsafe fixture comprises a pin as described and/or claimed herein. The pin passes through at least one hole formed by a part of the engine mount that is connected to the gas turbine engine and at least one hole that is formed by a part of the engine mount that is connected to the aircraft structure. The method comprises applying a predetermined torque to the driving portion of the driving washer and determining whether the applied torque results in rotation of the pin. If the applied torque does not result in rotation of the pin, the primary fixture is determined to have failed. If the applied torque does result in rotation of the pin, the primary fixture may be determined not to have failed.

Any feature described and/or claimed herein may optionally be used in combination with any other compatible feature described and/or claimed herein.

BRIEF DESCRIPTION OF THE DRAWINGS

Embodiments of the disclosure will now be described by way of non-limitative example with reference to the accompanying drawings in which.

DETAILED DESCRIPTION OF EMBODIMENTS

Figure 1:
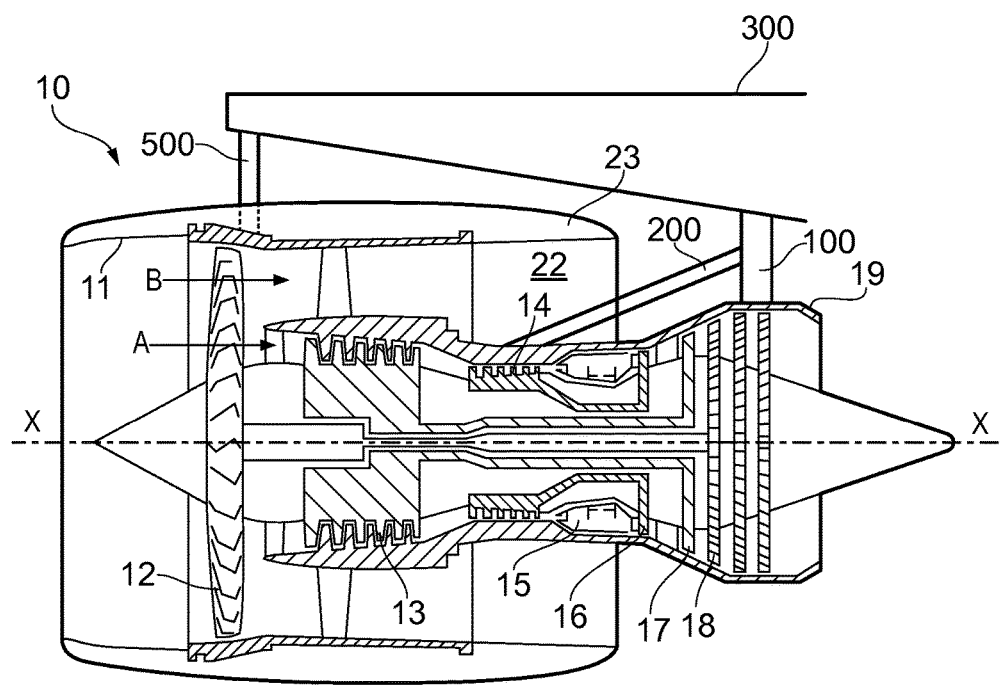
FIG. 1 shows a cross-section through a gas turbine engine.

With reference to FIG. 1, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

Each of the high, intermediate and low-pressure turbines 16, 17, 18 and the intermediate and high-pressure compressors 13, 14 comprises at least one stage comprising a set of rotor blades and a set of stator vanes. In use, the rotor blades rotate around the engine axis X-X, whilst the stator vanes are stationary within the engine.

It will be appreciated that the gas turbine engine 10 if FIG. 1 is shown by way of example only, and the present disclosure may be applied to any other type of gas turbine engine, for example with any arrangement of turbines, compressors, shafts and casings.

FIG. 1 also shows a pylon 300 to which the gas turbine engine 10 is mounted via a front mounting arrangement 500, and a rear mounting arrangement 100 to form a gas turbine engine installation. The gas turbine engine installation also comprises a thrust strut 200, through which the motive force generated by the engine is transmitted to the pylon 300. The pylon 300 may be a part of an aircraft (for example attached to the wing of an aircraft), and thus the gas turbine engine installation may be part of an aircraft. Further details of the gas turbine engine installation are discussed below in relation to FIGS. 2 to 9.

Figure 2:
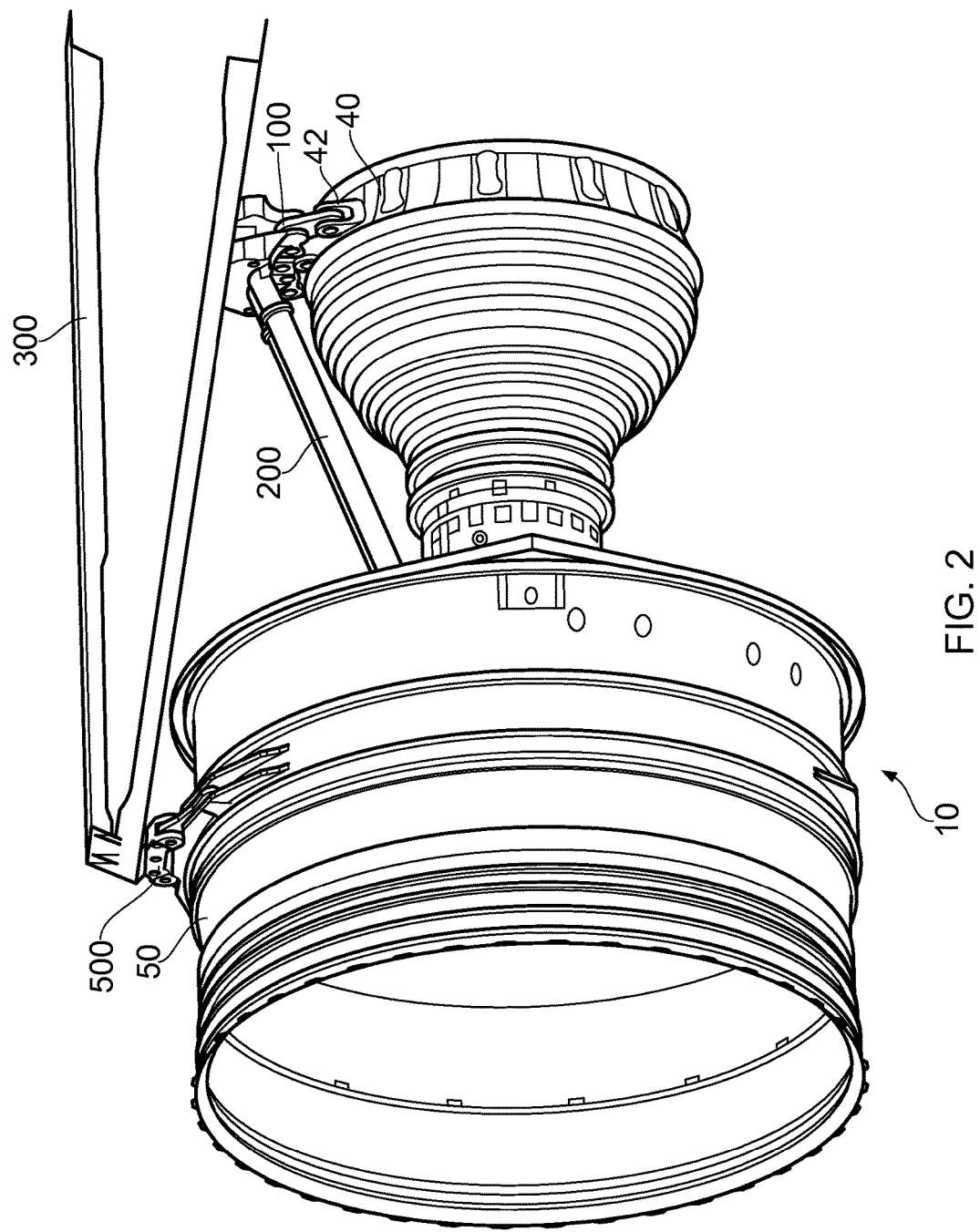
FIG. 2 shows a part of a gas turbine engine mounted to a pylon of an aircraft.

FIG. 2 shows a perspective view of the schematic cross-section shown in FIG. 1, with only a part of the engine 10 being shown in FIG. 2. In this exemplary arrangement, the front and rear mounting arrangements 100, 500 are connected to casings of the gas turbine engine 10. In particular, the front mounting 500 is connected to a fan casing 50, and the rear mounting 100 is connected to a core casing 40. The thrust strut 200 is connected between the core casing 40 and the rear mounting 100, although it will be appreciated that other arrangements are also possible.

Figure 3:
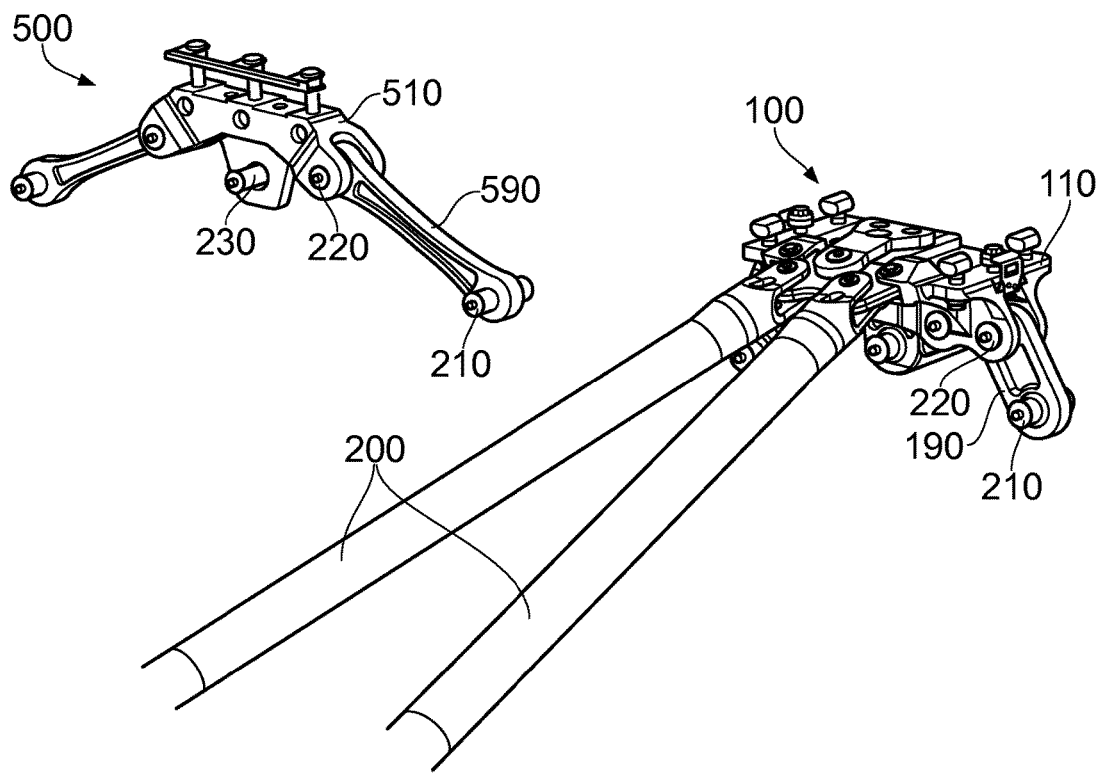
FIG. 3 shows a thrust strut and part of a mounting assembly used to attach a gas turbine engine to an aircraft.
Figure 4:
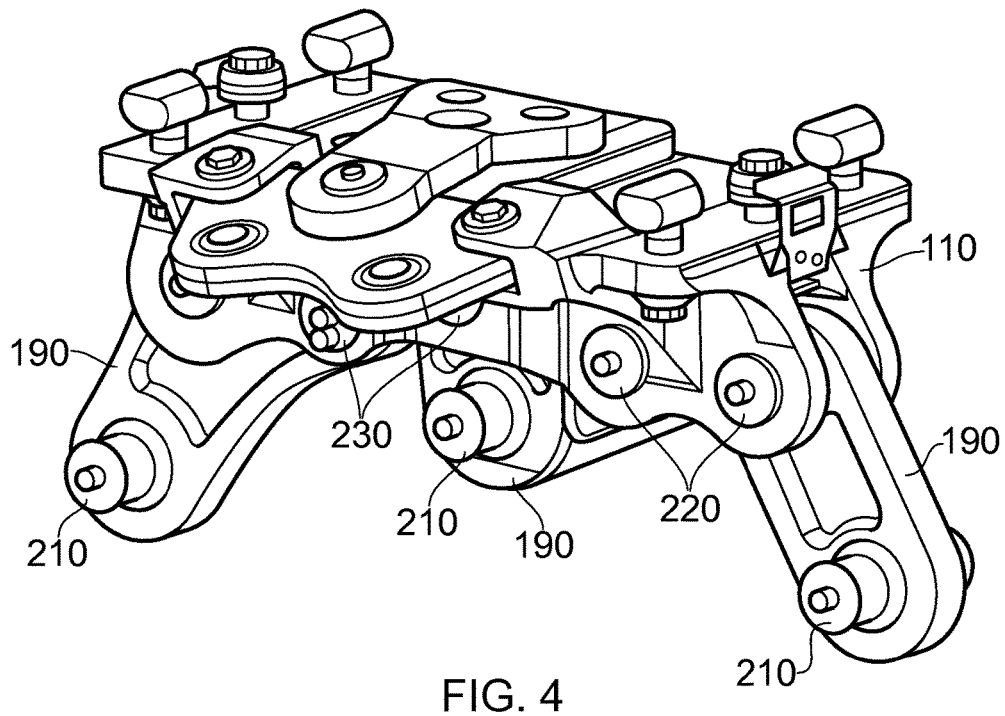
FIG. 4 is a close-up view of the mounting assembly features shown in FIG. 3.

FIG. 3 shows a part of both the front and rear mounting arrangements 100, 500 in isolation from the rest of the gas turbine engine installation. FIG. 4 shows the rear mounting arrangement 100 in greater detail. The front and rear mounting arrangements 100, 500 are shown by way of example only, and a great many other configurations may be possible.

The rear mounting arrangement 100 comprises a mounting bracket 110. The mounting bracket 100 is connected to one or more link elements 190, for example using connecting pins 220, as in the example shown in the Figures. In order to attach the link element(s) 190 to the engine, further pins 210 may be used. For example, as shown in FIG. 2, the link element(s) 190 may be located between lugs 42 provided on an engine casing 40, 50, and then a pin 210 may be connected through the lugs 42 and the link elements 190.

The front mounting arrangement 500 may have a similar arrangement, for example with different geometry. For example, the front mounting arrangement may comprise one or more link elements 590, connected to a mounting bracket 510 and an engine casing 50 using pins 210, 220.

The connections between the pins 210, 220, the link element(s) 190, 590, and the mounting brackets 110, 510 may be part of the load path that transfers load between the gas turbine engine 10 and the airframe 300 during normal operation. Accordingly, these features may be referred to as being part of a primary fixture, or primary connection, or part of the primary load path. The pins labelled 210, 220 in FIGS. 3 and 4 may be referred to as primary pins 210, 220.

In the event of failure of the primary path (for example through failure of one of the primary pins 210, 220), the integrity of the connection between the gas turbine engine 10 and the airframe 300 must be ensured. Accordingly, one or more failsafe (or catcher) pins 230 are provided. Such failsafe pins 230 may be provided to any mounting arrangement where there is a requirement for a backup (or redundant) load path in the event of failure of a primary load path. For example, both the front and rear mounting arrangements 100, 500 may be provided with such failsafe pins.

During normal operation (for example when the load passes through the normal, or primary, load path), there may be no material load passing through the failsafe pins 230. However, in the event of failure of the primary load path, one or more failsafe pin 230 is engaged. This allows continued safe operation of the mounting assembly 100, 500, but through a load path that now includes one or more failsafe pin 230.

In the Figures, failsafe pins 230 are shown as being provided between the link elements 190, 590 and the mounting bracket 110, 510 and/or the engine casing 40, 50. However, it will be appreciated that such failsafe pins 230 may be used in any desired location, for example in a load path between a mounting bracket 110, 510 and the aircraft structure 300. Indeed, one or more failsafe pins 230 may be provided, for example, anywhere in a mounting arrangement between a gas turbine engine 10 and an aircraft structure 300.

It is necessary to be able to check whether there has been a failure in the primary load path. For example, such a check may be performed at service intervals of the aircraft and/or engine. One method for performing such a check is to determine whether or not the failsafe pin 230 can be rotated about its longitudinal axis, for example by applying a predetermined torque to the pin, for example using a tool. If it is possible to rotate the failsafe pin 230 using the predetermined torque, then it may be concluded that no material load is being passed through the pin 230, and thus that there has not been a failure of the primary load path. However, if there has been a failure in the primary load path being protected by a particular failsafe pin 230, then that pin 230 will be carrying significant load, and it should not be possible to rotate it about its longitudinal axis using the predetermined torque.

However, it has been recognized that there is a danger that in checking a failsafe pin 230 in order to determine whether there has been a failure in the primary load path, the failsafe pin 230 may itself be inadvertently compromised, for example through partial disassembly or loosening of its component parts.

Figure 5:
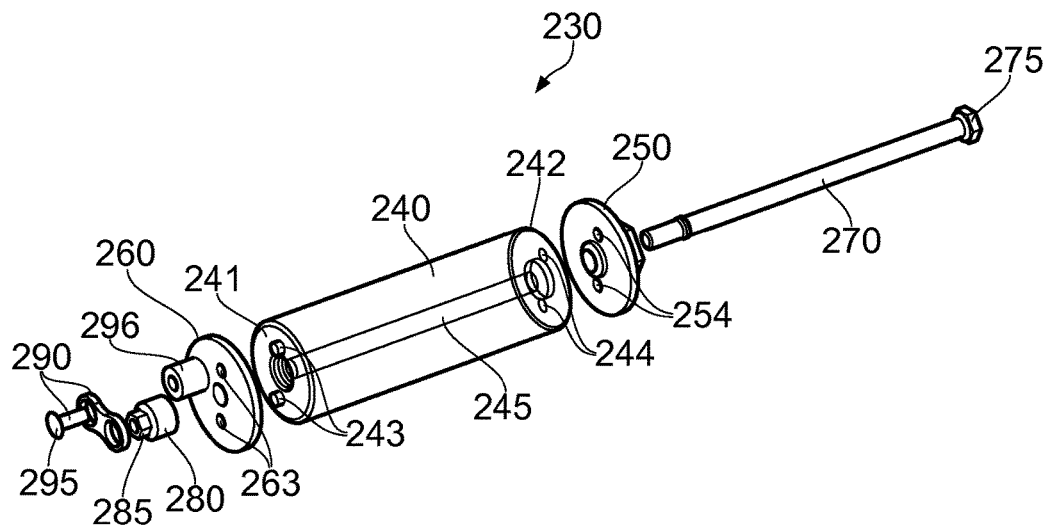
FIG. 5 is an expanded view of a pin.
Figure 6:
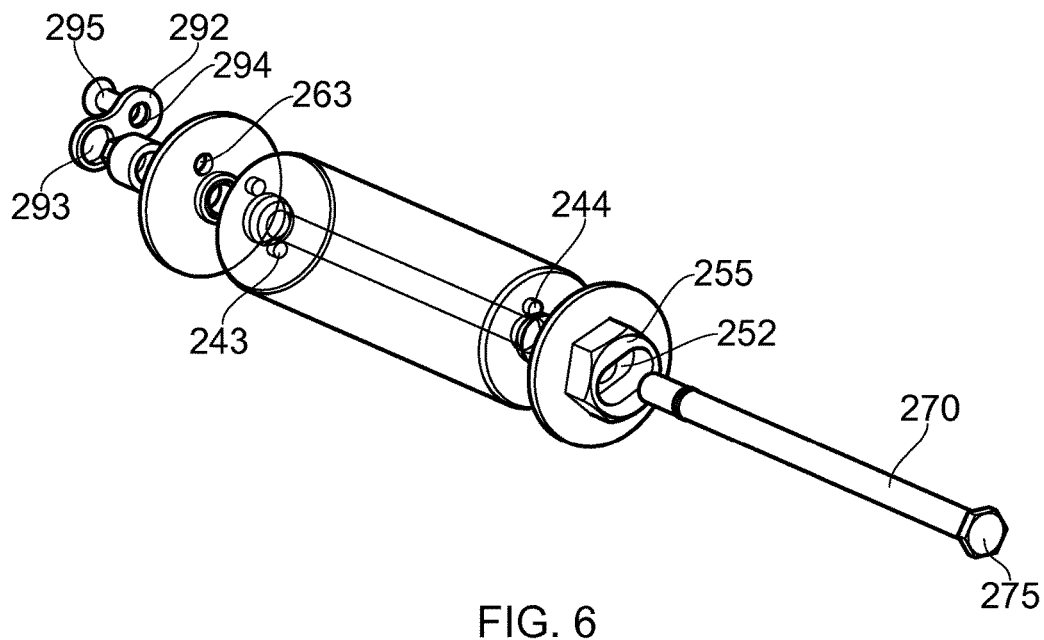
FIG. 6 is another expanded view of the pin of FIG. 5.
Figure 7:
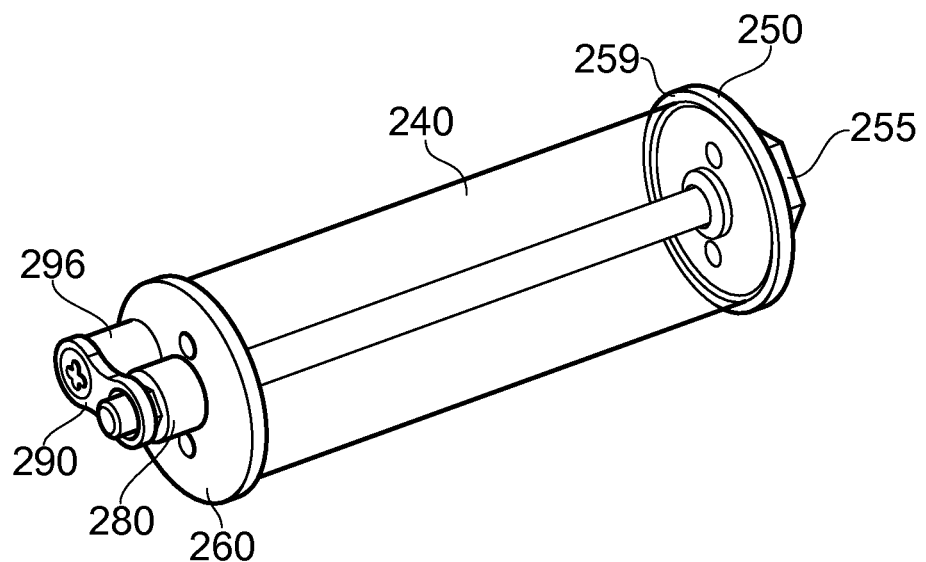
FIG. 7 is an assembled view of a pin.
Figure 8:
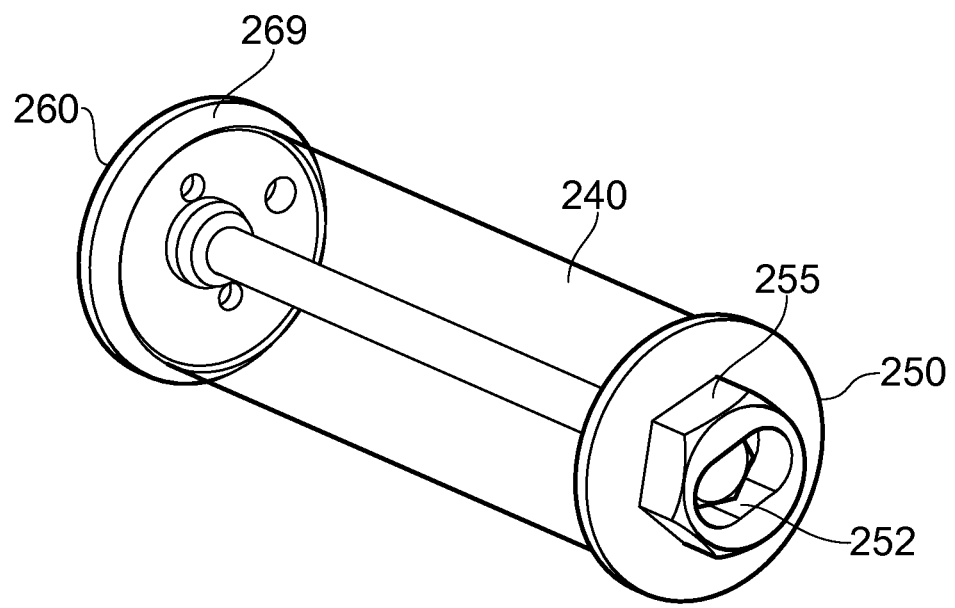
FIG. 8 is another assembled view of a pin.
Figure 9:
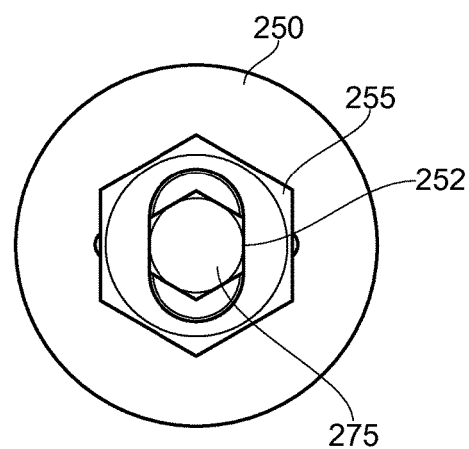
FIG. 9 is an end-on view of a pin looking along the longitudinal axis of the pin.

FIGS. 5 to 9 show various views of an example of a failsafe pin 230 that significantly reduces (or substantially eliminates) the possibility of the pin 230 being inadvertently compromised during regular maintenance. FIGS. 5 and 6 show exploded views of the failsafe pin 230, and FIGS. 7 and 8 show assembled views.

The pin 230 comprises a cylindrical body 240 having a through hole 245 formed therein. The through hole 245 passes along the central (or longitudinal) axis of the cylindrical body 240, from a first end face 242 to a second end face 241.

The pin 230 comprises a driving washer 250. The driving washer has a driving portion 255, through which a torque may be applied to the pin 230 when assembled. The torque that is applied to the driving washer 250 may be the predetermined torque that is applied to determine whether the pin 230 has been engaged, and thus whether there has been a failure of the primary load path, as described herein. The pin 230 also comprises an anti-tamper washer 260.

During assembly of the pin 230, the driving washer 250 engages the first end face 242 and the anti-tamper washer 260 engages the second end face 241 under the action of a nut 280 and bolt 270 fastening. The bolt 270 tightens against the driving washer 250 and the nut 280 tightens against the anti-tamper washer 260 in the illustrated arrangement, although this may be the other way around. In the assembled state shown in FIGS. 7 and 8, the bolt 270 passes through holes in the anti-tamper washer 260 and the driving washer 250, and through the through hole 245 in the cylindrical body 240.

The driving washer 250 comprises a retaining feature 252. The retaining feature 252 may be in the form of a recess 252, for example provided within the driving portion 255 as in the example of FIGS. 5 to 9. During assembly of the failsafe pin 230, as the nut 280 and the bolt 270 are tightened together, a bolt head 275 of the bolt 270 is drawn into the recess 252 into a retained position. This is shown clearly in FIG. 9, for example, with the bolt head 275 clearly within the recess 252. In the retained position, it may be impossible to apply a necessary torque to untighten the nut 280 and bolt 270, for example because it may not be possible to access the bolt head 275 with an appropriate tool.

The nut 280 has a nut head 285 that may be engaged with a suitable tool to tighten the nut 280 and bolt 270 together during assembly. The pin 230 also comprises an anti-tamper element 290 that prevents full access to the nut head 275 after assembly of the rest of the pin 230. The anti-tamper element 290 may be provided after the nut 280 and the bolt 270 have been tightened such that the cylindrical body 240, the driving washer 250 and the anti-tamper washer 260 are clamped together.

The exemplary anti-tamper element 290 shown in FIGS. 5 to 8 comprises a plate 292 having a through hole 293. When the anti-tamper element 290 is fixed in position, the hole 293 surrounds the nut head 285. This may prevent access to the nut head 285 with a suitable tool, thereby preventing an appreciable torque (for example a loosening torque, which may be referred to as a predetermined torque) being applied to the nut head.

The anti-tamper element 290 may be connected to the anti-tamper washer 260 in any suitable manner. In some arrangements, at least a part (for example all) of the anti-tamper element 290 may be integral with the anti-tamper washer 260. The exemplary anti-tamper element 290 shown in FIGS. 5 to 8 comprises an opening 294, which may be referred to a fixing hole 294. The fixing hole 294 is offset from the centre-line of the cylindrical body 240 (which may, of course, be said to be aligned with a centreline of the pin 230 itself). In order to attach the exemplary anti-tamper element 290 shown in FIGS. 5 to 8 to the anti-tamper washer 260, a fixing element 295 is used. Part of the fixing element 295 passes through the fixing hole 294 and engages a receiving feature 296 on the anti-tamper washer 260. The fixing element may be, for example, a threaded element such as a screw. The receiving feature 296 may be, for example, a threaded-element receiving hole.

As shown most clearly in FIGS. 5 and 6, the cylindrical body of the illustrated arrangement comprises dowels 244 on the first end face 242. When the pin 230 is assembled, the dowels 244 engage corresponding recesses (or holes) 254 in the driving washer 250. The engaged dowels 244 and recesses 254 allow torque to be transferred from the driving washer 250 to the cylindrical body 240. A similar arrangement of dowels 243 and recess 263 is provided to transfer torque from the cylindrical body 240 to the anti-tamper washer 260. Of course, the dowels 243, 244 may be provided on the washers 250, 260, with corresponding recesses formed in the cylindrical body 240.

Such an arrangement of one or more dowels 244 and one or more corresponding receiving recesses 254 may be applied in any arrangement of failsafe pin 230. Additionally or alternatively, any other suitable arrangement for transferring torque to/from the cylindrical body 240 and the anti-tamper washer 260 or the driving washer may be used, or indeed in some arrangements of failsafe pin 230 no specific arrangement or features for transferring the torque may be required.

As shown most clearly in FIGS. 7 and 8, the perimeter of the driving washer 250 and the perimeter of the anti-tamper washer 260 extend beyond the edge of the cylindrical body 240. In the illustrated arrangements, the diameter of the driving washer 250 is greater than the diameter of the cylindrical body 240. A part 259 of the face surface of the driving washer 250 therefore extends beyond the cylindrical body 240. The part 259 of the surface may be an annular shape, as shown in FIGS. 7 and 8. Similarly, a part 269 of the face surface of the anti-tamper washer 260 extends beyond the cylindrical body 240. These exposed annular surfaces 259, 269 may be referred to as fixing surfaces 259, 269, because when the pin 230 is assembled in a mounting arrangement 100, 500 (as shown in FIGS. 3 and 4, for example) these fixing surfaces 259, 269 may prevent the pin 230 from sliding through the structures of the mounting arrangements 100, 500 (for example through the mounting bracket 110). The fixing surfaces 259, 269 may extend beyond (for example have a larger diameter) than the holes in the bracket 110 and link element 190 through which the pin 230 extends. The fixing surfaces 259, 269 may or may not bear against the structure(s) through which the pin 230 extends (for example the mounting bracket 110). In arrangements in which the fixing surfaces 259, 269 do bear against the structure(s) through which the pin 230 extends, it should still be possible to rotate the pin 230 within the holes under a predetermined torque to test for engagement of the pin 230, as described elsewhere herein.

With a failsafe pin 230 such as that described above in relation to FIGS. 5 to 9 in position, a driving torque may be applied to the driving element 255 without the possibility of unintentionally compromising the pin 230 itself. The bolt head 275 may be prevented from inadvertent rotation by virtue of the retaining feature 252. The nut head 285 may be prevented from inadvertent rotation by the anti-tamper element 290. This may allow determination of whether the failsafe pin 230 has been engaged, and/or whether there has been a failure of a primary load path, without the possibility of unintentionally compromising the pin 230 itself, for example through unintentional dismantling.

Where reference is made herein to a gas turbine engine, it will be appreciated that this term may include may be any type of gas turbine engine, including, but not limited to, a turbofan (bypass) gas turbine engine, turbojet, turboprop, ramjet, scramjet or open rotor gas turbine engine, and for any application, for example aircraft, industrial, and marine application. Furthermore, it will be appreciated that many different arrangements in addition to those described herein may fall within the scope of the attached claims. Purely by way of non-limitative example, different arrangements of retaining features 252, driving elements 255, torque-transmitting features 243, 244, 255, 263, anti-tamper elements 290, bolts 270 and nuts 280 may fall within the scope of the claims. By way of further example, whilst the pin 230 of FIGS. 5 to 9 is shown as having the bolt head 275 retained in the retaining feature 252 of the driving washer and the anti-tamper element 290 preventing access to the nut head 285, it will be appreciated that the pin 230 may be assembled in the opposite sense, such that the nut head 285 is retained in the retaining feature 252 of the driving washer and the anti-tamper element 290 prevents access to the bolt head 275.

I claim:

1. A pin for extending through a first hole of a first body and second hole of a second body so as to prevent separation of the first body from the second body, the pin comprising:
    a cylindrical body having a through-hole passing from a first end face to a second end face of the cylindrical body;
    a driving washer provided on the first end face;
    an anti-tamper washer provided on the second end face; and
    a bolt passing through the driving washer, the through-hole in the cylindrical body, and the anti-tamper washer to engage a nut, so as to clamp the cylindrical body, the driving washer and the anti-tamper washer together, wherein:
    the driving washer comprises a driving portion configured to provide a torque to the pin, and a retainer against which either a bolt head of the bolt or a nut head of the nut is located so as to prevent full access to the bolt head or the nut head when the pin is in an assembled state; and
    the anti-tamper washer is provided with an anti-tamper element that prevents full access to the other of the nut head or the bolt head when the pin is in the assembled state, the anti-tamper element comprising:
        a receiving feature having a center that is offset from a center of the through-hole of the cylindrical body; and
        a shield configured to be secured to the receiving feature, the shield having an anti-tamper hole that surrounds a perimeter of the nut head or the bolt head to prevent full access to the nut head or the bolt head.

2. The pin according to claim 1, wherein the retainer is a recess formed in the driving portion of the driving washer.

3. The pin according to claim 1, wherein the anti-tamper element comprises a fixing hole through which a fixing element passes in order to connect the anti-tamper element to the receiving feature.

4. The pin according to claim 1, wherein the driving washer and the first end face of the cylindrical body are provided with corresponding engagement elements to allow torque provided to the driving washer via the driving portion to be transmitted to the cylindrical body.

5. The pin according to claim 1, wherein the anti-tamper washer and the second end face of the cylindrical body are provided with corresponding engagement elements to allow torque to be passed from the cylindrical body to the anti-tamper washer.

6. A mounting arrangement for attaching a first body to a second body, the mounting arrangement comprising:
    a pin passing through a first hole in the first body and a second hole in the second body, the pin comprising:
        a cylindrical body having a through-hole passing from a first end face to a second end face of the cylindrical body;
        a driving washer provided on the first end face;
        an anti-tamper washer provided on the second end face; and
        a bolt passing through the driving washer, the through-hole in the cylindrical body, and the anti-tamper washer to engage a nut, so as to clamp the cylindrical body, the driving washer and the anti-tamper washer together, wherein:
    the driving washer comprises a driving portion configured to provide a torque to the pin, and a retainer against which either a bolt head of the bolt or a nut head of the nut is located so as to prevent full access to the bolt head or the nut head when the pin is in an assembled state,
    the anti-tamper washer is provided with an anti-tamper element that prevents full access to the other of the nut head or the bolt head when the pin is in the assembled state, and
    the mounting arrangement comprises a further primary connection between the first body and the second body, such that the pin is a failsafe pin that only engages upon failure of the primary connection.

7. The mounting arrangement according to claim 6, wherein the pin is constrained from movement in the direction of the longitudinal axis of the cylindrical body through engagement of the driving washer with the first or second body and/or engagement of the anti-tamper washer with the first or second body.

8. The mounting arrangement according to claim 6, wherein:
    the first body is a mounting bracket for connecting an aircraft structure to a gas turbine engine via a link element, the second body being the link element;
    the mounting bracket comprises two lugs each having a mounting hole;
    the link element is positioned at least partially between the two lugs and comprises one link element hole; and
    the cylindrical body extends, in order, through a mounting hole in one lug of the mounting bracket, the link element hole, and the mounting hole of the other lug.

9. The mounting arrangement according to claim 8, wherein, upon assembly and in normal operation, substantially no load is transferred between the mounting bracket and the link element via the pin, such that the cylindrical body is rotatable within mounting holes of the mounting bracket and the link element by applying a torque to the driving portion of the driving washer.

10. A method of assembling the anti-tamper securing pin of claim 1 for securing a first body to a second body comprising:
   passing the bolt through, in turn:
      the driving washer;
      the through-hole in the cylindrical body; and
      the anti-tamper washer;
   tightening the bolt onto the nut so as to clamp the cylindrical body, driving washer and anti-tamper washer together; and
   providing the anti-tamper washer with the anti-tamper element that prevents full access to the nut head of the nut or the bolt head of the bolt when the pin is in the assembled state.

11. A method of testing the integrity of an engine mount for mounting a gas turbine engine to an aircraft structure, wherein:
   the engine mount comprises:
      a primary fixture for connecting the gas turbine engine to the aircraft structure; and
      a failsafe fixture that only engages to connect the gas turbine engine to the aircraft structure in the event of failure of the primary fixture, the failsafe fixture comprising the pin according to claim 1 passing through at least one hole formed by a part of the engine mount that is connected to the gas turbine engine and at least one hole that is formed by a part of the engine mount that is connected to the aircraft structure; and
   the method comprises:
      applying a predetermined torque to the driving portion of the driving washer and determining whether the applied torque results in rotation of the pin, wherein
      if the applied torque does not result in rotation of the pin, the primary fixture is determined to have failed.

12. A pin for extending through a first hole of a first body and second hole of a second body so as to prevent separation of the first body from the second body, the pin comprising:
   a cylindrical body having a through-hole passing from a first end face to a second end face of the cylindrical body;
   a driving washer provided on the first end face;
   an anti-tamper washer provided on the second end face; and
   a bolt passing through the driving washer, the through-hole in the cylindrical body, and the anti-tamper washer to engage a nut, so as to clamp the cylindrical body, the driving washer and the anti-tamper washer together, wherein:
   the driving washer comprises a driving portion configured to provide a torque to the pin, and a retainer against which either a bolt head of the bolt or a nut head of the nut is located so as to prevent full access to the bolt head or the nut head when the pin is in an assembled state, the retainer is a recess formed in the driving portion, the recess including a stadium or oblong shape; and
   the anti-tamper washer is provided with an anti-tamper element that prevents full access to the other of the nut head or the bolt head when the pin is in the assembled state.

* * * * *